US006937211B2

(12) United States Patent
Roelofs

(10) Patent No.: US 6,937,211 B2
(45) Date of Patent: Aug. 30, 2005

(54) APPARATUS AND SYSTEM FOR ABSTRACT VISUAL REPRESENTATION OF AUDIO SIGNALS

(75) Inventor: Gregory Robert Roelofs, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 333 days.

(21) Appl. No.: 09/966,610

(22) Filed: Sep. 27, 2001

(65) Prior Publication Data

US 2003/0058197 A1 Mar. 27, 2003

(51) Int. Cl.$^{7}$ .......................... H04M 1/22; G09G 3/00; G09G 3/20; G09G 3/34

(52) U.S. Cl. .......................... 345/31; 345/81; 345/56; 362/86

(58) Field of Search .......................... 345/84–86, 30–32, 345/35, 36, 39, 51, 56; 362/555, 84–86

(56) References Cited

U.S. PATENT DOCUMENTS

| | | | | | |
|---|---|---|---|---|---|
| 4,140,997 | A | * | 2/1979 | Brady | 600/545 |
| 4,355,348 | A | | 10/1982 | Williams | |
| 4,378,569 | A | | 3/1983 | Dallas, Jr. et al. | |
| 5,402,702 | A | | 4/1995 | Hata | |
| 5,469,020 | A | * | 11/1995 | Herrick | 313/511 |
| 5,534,888 | A | * | 7/1996 | Lebby et al. | 345/672 |
| 6,225,966 | B1 | * | 5/2001 | Ohtani et al. | 345/87 |
| 6,270,229 | B1 | * | 8/2001 | Chien | 362/84 |
| 6,637,906 | B2 | * | 10/2003 | Knoerzer et al. | 362/84 |
| 2002/0030638 | A1 | * | 3/2002 | Weiner | 345/30 |

FOREIGN PATENT DOCUMENTS

| | | |
|---|---|---|
| GB | 2277694 | 11/1994 |

* cited by examiner

*Primary Examiner*—Patrick N. Edouard
*Assistant Examiner*—Duc Dinh
(74) *Attorney, Agent, or Firm*—Dicran Halajian

(57) ABSTRACT

An apparatus including a controller having an input for receiving an input signal is disclosed, the input signal having an audio component. A housing having an outer surface on which is fixed a conforming and surface covering light output device is also provided, whereby the controller enables creation of a visually dynamic decorative pattern on the surface of the housing dependent on the input signal and under the control of software programs. The controller enables creation of a visually dynamic decorative pattern on the surface of the housing dependent on the signal and under the control of pattern producing software. The input signal can be an audio, video, and/or environmental input signal. The output device can be visual display, audio speaker array, scent generator, and/or tactile device.

22 Claims, 5 Drawing Sheets

APPARATUS AND SYSTEM FOR ABSTRACT VISUAL REPRESENTATION OF AUDIO SIGNALS

BACKGROUND OF THE INVENTION

1. Field of the Invention

The present invention relates generally to a system for converting an audio signal to an abstract graphical representation thereof, and more particularly to a system that receives an audio signal from an external source, converts the audio signal into an abstract visual signal, and outputs the visual signal to an output device, the output device conforming to the shape of an outer surface of a physical case.

2. Description of the Related Art

Audio and video components are commonplace in today's consumer electronics (CE) market. Most home entertainment systems contain various forms of these devices including televisions, amplifiers, VCRs, radio tuners, equalizers, and DVD players, to name a few. Also, the home computer is recently becoming an integral part of the home entertainment system. Each of these devices has one common element—a physical case that comes in a standard color (usually black or white). Component manufacturers continuously change the design of the component cases to make them more pleasing to the consumer by changing the shapes and adding various "bells-and-whistles" to the components.

There are devices related to home entertainment electronics that provide the consumer with visual displays based on an input signal. These devices receive audio signals and output visual representations of the input audio signal. One example of an existing device is disclosed in U.S. Pat. No. 4,355,348 issued to Williams that discloses a system that provides an optical display as a function of frequency and amplitude of an audio music signal. The system is comprised of a plurality of frequency selection circuits and a corresponding plurality of linear optical displays resulting in a composite bar display which includes a plurality of linear bar segments each having a length which varies as a function of amplitude of a corresponding frequency component of the input music signal. The display is in the form of a row and column array of individual optical display elements such as LED's. The Williams' apparatus also includes bar/dot display drivers and an operator-responsive switch for alternately selecting either a bar or a dot display at the LED array.

Analogous devices to that disclosed in Williams have been developed into spectrum analyzers commonly found incorporated into systems that output audio signals. The common spectrum analyzer outputs a visual signal representing the amplitude of a particular frequency of a given audio input signal. A plurality of light emitting diodes (LEDs) is associated with each frequency. As the amplitude of a particular frequency varies, the number of LEDs that are lit varies accordingly.

Certain computer media players (such as the RealJukebox and Sonique player) play MP3 music files (among other formats), thus generating audio output. Such players are also capable of generating video that is displayed to the viewer over the computer's monitor. For example, the computer monitor may display a series of bar graphs having amplitudes that oscillate with the beat of the music output.

Display devices are well known. The bulky and large cathode ray tube (CRT) of the early televisions has long been surpassed by the development of new and ever thinner flat panel displays. The newer displays are incorporating the technologies of hybrid organic-inorganic semiconductor diodes, display pixels comprised of thin film transistors, and LEDs constructed from light-emitting organic polymers. Whatever the technology, the resulting displays are entering into the micrometer thickness range, a far cry from the fat and bulky CRTs of the past.

In the CE market, the above devices fail to provide the user with anything but a direct representation of an input signal. Presently, no devices exist that are comprised of a thin film wrapped around the surface of a device or moldable into the surface of the device that can output a visual display. Further, none of the above-mentioned CE devices provide the user with a visually pleasing housing surface. The present invention solves this deficiency.

SUMMARY OF THE INVENTION

It is, therefore, an aspect of the present invention to provide an apparatus and system for displaying from the surface of an object an abstract visual representation of an input signal.

It is another aspect of the present invention to provide an apparatus and system for displaying from the surface of an object an abstract audio representation of an input signal.

It is a further aspect of the present invention to provide an apparatus and system for displaying various scents based on an input signal.

It is yet a further aspect of the present invention to provide an apparatus and system for displaying an abstract tactile representation of an input signal.

The above aspect can be achieved by providing an apparatus comprising a controller having an input for receiving a signal, a housing having an outer surface on which is fixed a conforming and surface covering light output device. The controller enables creation of a visually dynamic decorative pattern on the surface of the housing dependent on the signal and under the control of pattern producing software. The input signal can be an audio, video, and/or environmental input signal. The output device can be a visual display, as well as an audio speaker array, scent generator, and/or tactile device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1A:
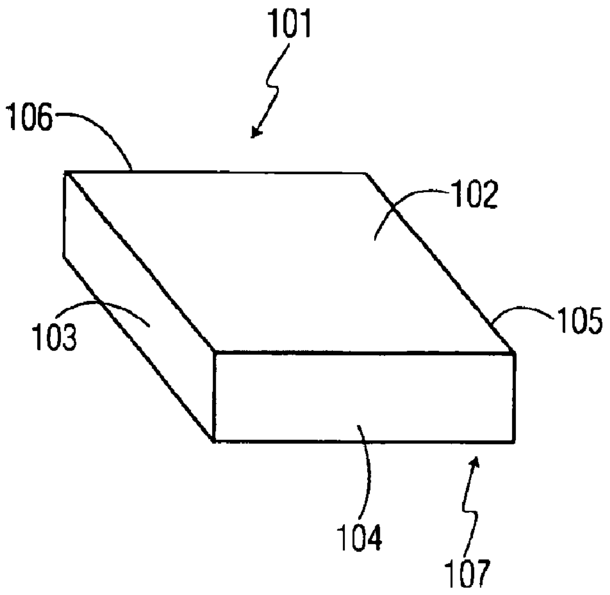
FIGS. 1*a* and 1*b* are a perspective view and top plan view, respectively, of a piece of equipment with which the present invention may be used, and a preferred embodiment of the present invention.
Figure 1B:
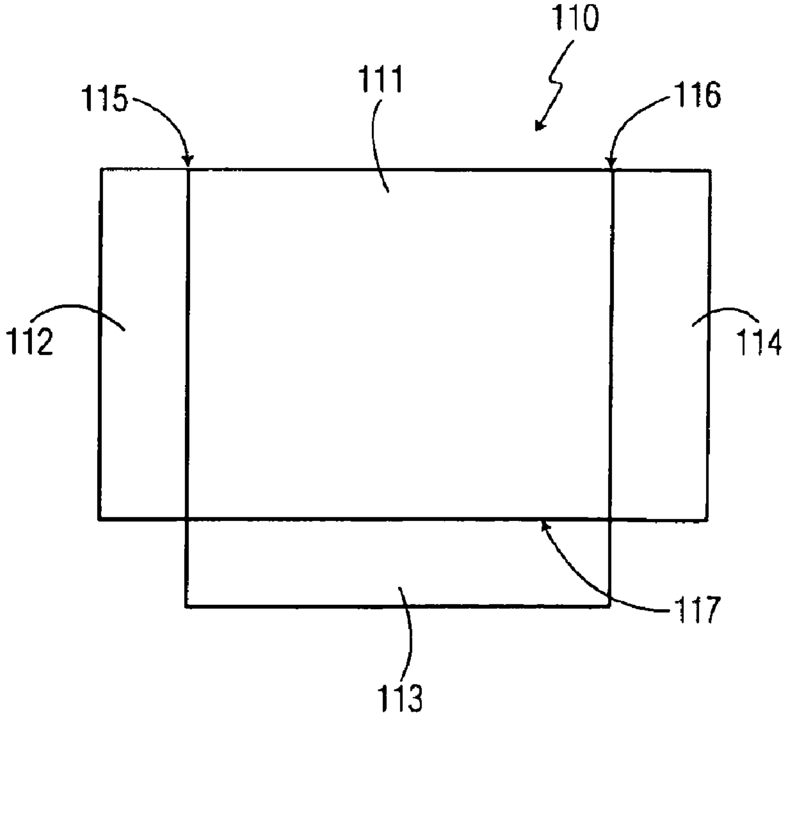

FIG. 1*a* and FIG. 1*b* illustrate a preferred embodiment of the present invention and a piece of equipment with which it may be used. In FIG. 1*a*, a physical case 101 of a CE device is shown. The CE device might be an audio component (e.g. radio tuner, amplifier, tape deck, CD player, speaker, etc.), a video component (e.g. television, VCR, DVD player, digital video recorder), computer component (e.g. monitor, mainframe, modem), or any other device for that matter having a housing with an outer surface. Depending on the device, the shape will change accordingly. A rectangular box shape is shown in FIG. 1 for simplicity purposes, but it is contemplated that the present invention could be applied to a housing of any shape and size.

Physical case 101 is comprised of a top 102, a left side 103, a front 104, a right side 105, a back 106, and a bottom 107. Shown in FIG. 1*b* is display device 110 according to an embodiment of the present invention. The display device 110 is comprised of four sections: a top panel 111, a left side panel 112, a front panel 113, and a right side panel 114. The display device 110 is shown in an unfolded state. When the display device 110 is applied to the physical case 101 according to this embodiment, the display device 110 folds at creases 115. 116 and 117, forming 90 degree angles between the planar surface of the top panel 111 and the planar surfaces of left side panel 112, right side panel 114 and front panel 113, thus covering the top 102, left side 103, front 104 and right side 105 of the physical case 101, respectively. The back 106 and bottom 107 remain uncovered by the display device 110 in the preferred embodiment, since they are generally not seen when the equipment is used.

According to a second embodiment of the present invention, the display device dose not fold at creases, but instead is constructed from a material that is moldable. Thus, when used, the display device is place over the physical case and formed to the shape of the physical case. Accordingly, the present invention contemplates meanings for folding that include creases and moldable material.

In the preferred embodiment of the present invention the display device 110 is constructed from organic polymer compounds as a luminescent material in an electroluminescence display device (ELD). Though the preferred embodiment utilizes electroluminescent material, any known light-emitting device with similar dimensional properties can be used. Although the preferred embodiment utilizes an organic polymer compound as the luminescent material, any of the now known or developing flat display technologies can be utilized. Other flat display technologies contemplated for use are hybrid organic-inorganic semiconductor diodes, and display pixels driven by thin film transistors. Display devices that are thinner and/or more durable are also contemplated as these display technologies continue to develop. It is also contemplated as another aspect of the present invention that the physical case of the CE equipment itself can be manufactured out of the display material, thus eliminating the separate unit described herein.

Figure 2:
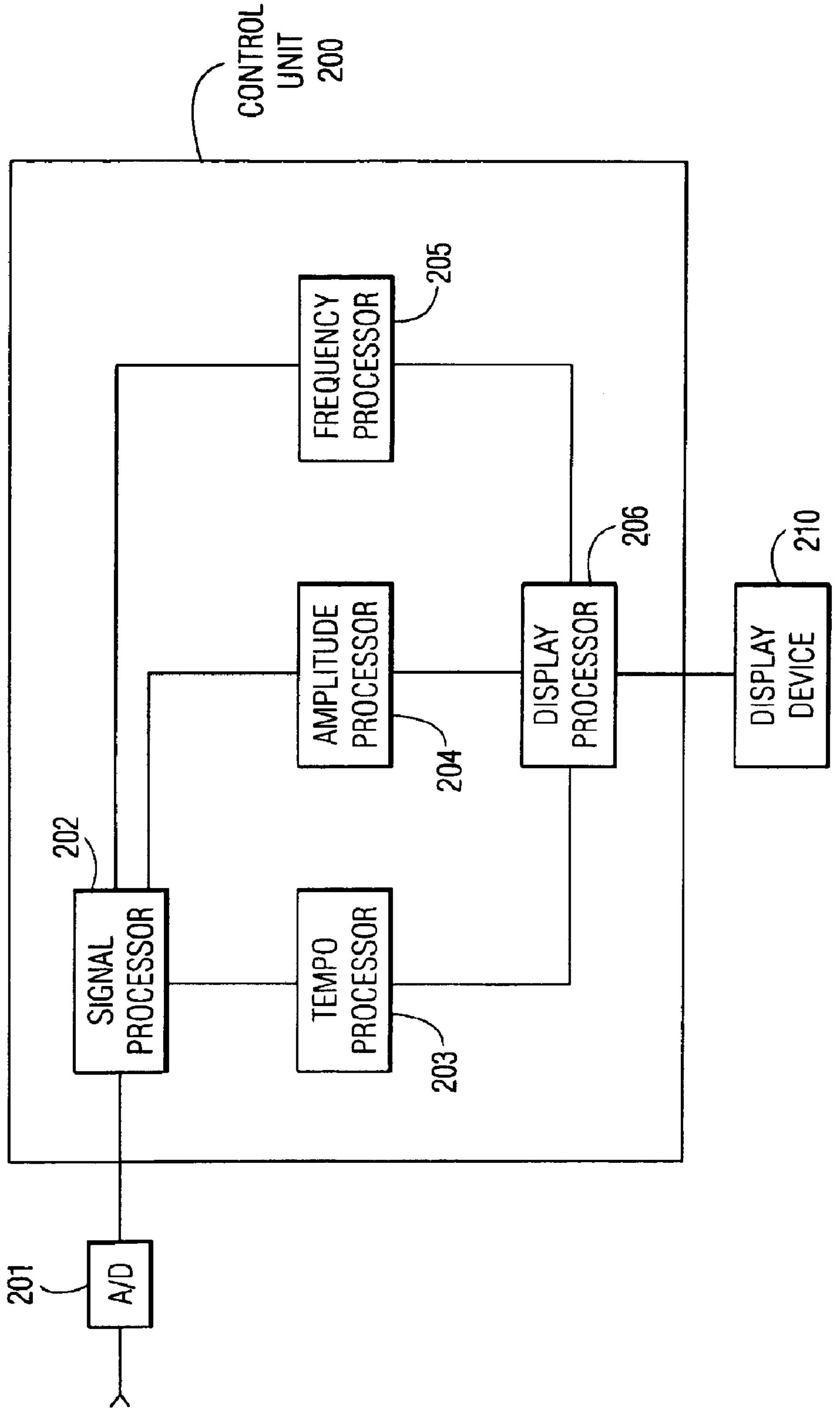
FIG. 2 is a block diagram illustrating the components of a system for creating visual representations of audio signals according to the preferred embodiment of the present invention.

FIG. 2 is a block diagram of the system components of the preferred embodiment of the present invention. The elements of FIG. 2 can be incorporated into the CE device or can be a separate stand-alone system. An audio input signal is received at the input of analog-to-digital (A/D) converter 201, converted to a digital signal and forwarded to signal processor 202 of control unit 200. The source of the audio signal can be from an audio amplifier, a microphone, a computer system sound card, etc. It is appreciated that the input signal can be a digital signal whereby the A/D converter 201 can be eliminated. The signal processor 202 separates the signal into three main audio signal components: tempo, amplitude and frequency. Although these three components are the ones shown in the preferred embodiment, variations thereof are contemplated, and any audio processing method can be implemented. The tempo component is forwarded to a tempo processor 203, the amplitude component is forwarded to an amplitude processor 204, and the frequency component is forwarded to a frequency processor 205. The outputs of the tempo 203, amplitude 204 and frequency 205 processors are forwarded to a display processor 206. Although FIG. 2 illustrates the control unit 200 having five separate processors, this is done for ease of description only; all of the processing can occur in a single processor, if desired. The display processor 206 then addresses the signal onto the display device 110. This overall performing process converts the audio signal into a visual pattern.

Though not shown in FIG. 2, in a further embodiment of the present invention, a memory unit is included in control unit 200 to store various software programs that vary the audio signal processing in preprogrammed patterns. As described earlier, an audio signal may be analyzed (or decomposed) in terms of several components. Among them are amplitude, frequency, and tempo. These different audio components can be varied through a filtering process to adjust the output signal. For example, by increasing the amplitude of the audio signal, the visual pattern produced might become brighter. As an alternative the output signal might be programmed to change color as the amplitude increases. As another example, the software might be programmed to produce a flashing pattern. The frequency of the flashing can be directly related to the frequency component of the audio signal; or, the software can be programmed to produce an inverse relation between the frequency of the flashing and the frequency component of the audio signal. Also contemplated is a user interface that enables the user to adjust and vary the signal processing to adjust the output signal accordingly.

Figure 3:
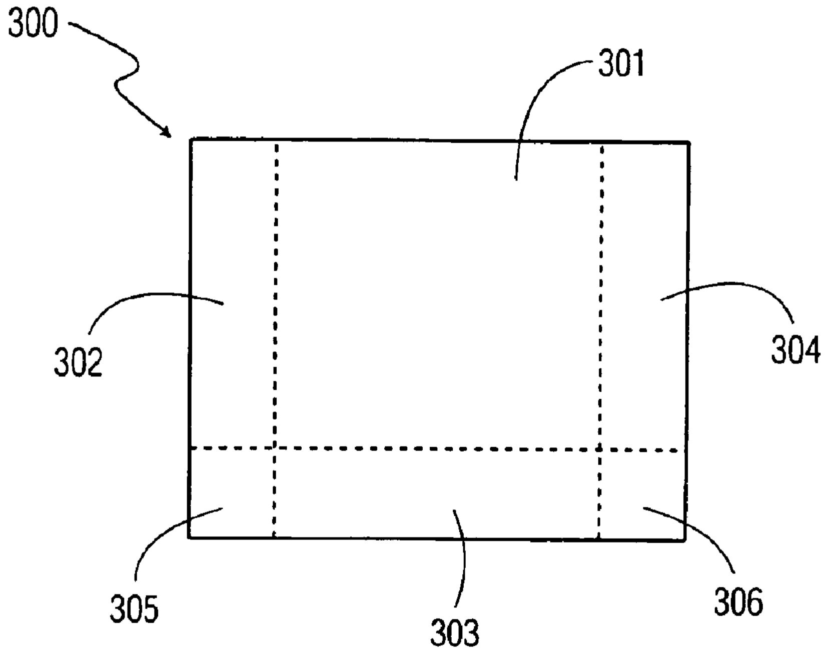
FIG. 3 is a diagram illustrating an overview of the addressing technique used in the preferred embodiment of the present invention.

FIG. 3 is a diagram illustrating the addressing technique used in the preferred embodiment of the present invention. Shown in FIG. 3 is representation of a flat screen display 300 on which is superimposed display device 110. Referring to FIG. 1*b*, top panel 111, left side panel 112, front panel 113, and right side panel 114 are represented in FIG. 3 by sections 301, 302, 303, and 304, respectively. When mapping the output video data onto the display device 110, sections 305 and 306 are not mapped, as they share no corresponding panel on display device 110. As was earlier described, the present invention does not limit itself to a rectangular physical case. For example, the present invention can be applied to a computer monitor having multiple planar surfaces. Mapping can be performed similarly to that described above when viewing any shaped display device in an unfolded 2-dimensional state.

Figure 4:
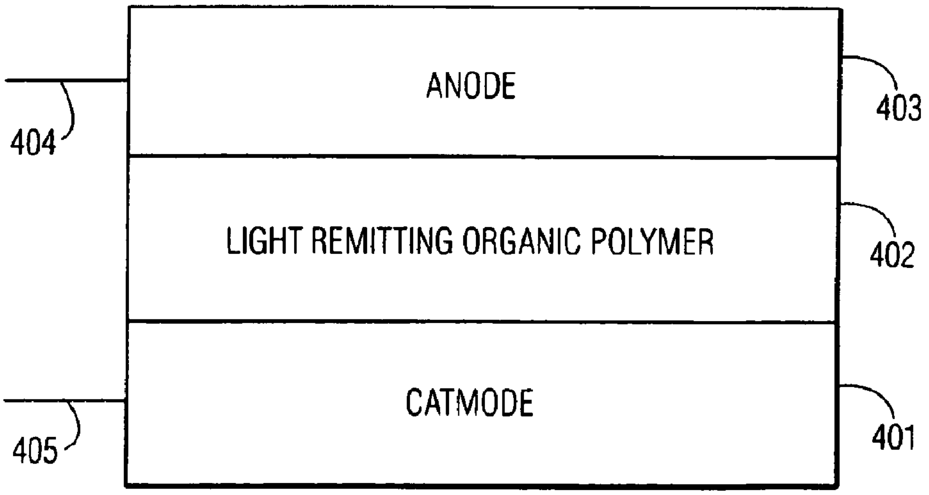
FIG. 4 is a cross-sectional view of a an electroluminscence display (ELD) device utilized in the present invention.

In one embodiment of the present invention, display device 110 is comprised of an array of ELDs. FIG. 4 is a cross-sectional view of a single ELD device utilized in the present invention. A single ELD is comprised of a cathode 401, a light emitting organic polymer layer 402, a transparent anode 403, anode lead 404, and cathode lead 405. When an electrical voltage is applied across anode lead 404 and cathode lead 405, the current produced causes the light emitting organic polymer contained in layer 402 to radiate visible light.

Figure 5:
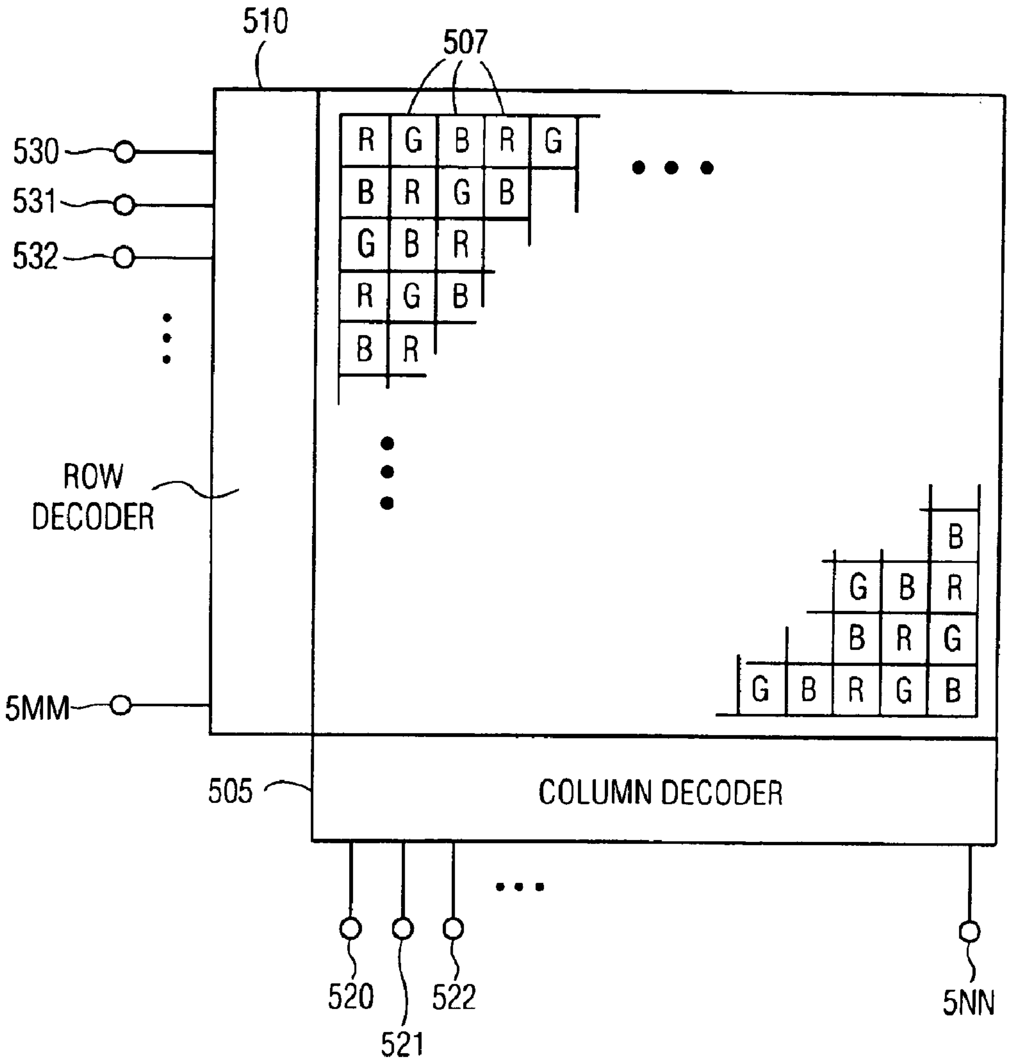
FIG. 5 is a diagram illustrating the ELD device of FIG. 4 integrated into a display array.

FIG. 5 is a diagram illustrating the ELD device of FIG. 4 integrated into a display array. A repeating offset red "R"—green "G"—blue "B" array is shown. When the array is created, each ELD can more commonly be referred to as a pixel. A plurality of pixels 507 is shown in FIG. 5. Each ELD or pixel is connected through a column decoder 505 and a row decoder 510, to column decoder leads 520 to 5NN, and row decoder leads 530 to 5MM. In this example, there are 5NN×5MM number of pixels. The column decoder leads and row decoder leads are connected to display processor 206 shown in FIG. 2, thus placing control of the pixels and overall display with the processor 206.

Thus, where a device primarily generates audio output, then organic/polymer LED sheets (i.e., thin, flexible, transparent sheets) may be used on the external casing of the device or another object. The LEDs are connected to a controlling processor that is also able to receive the audio. The processor is programmed to trigger the LEDs as a function of the audio input received. The LEDs may be triggered, for example, such that the left half of the LEDs on the device or object corresponds to a left stereo channel of the audio generating device and the right half of the LEDs on the device or object corresponds to a right stereo channel of the audio generating device. The processor may also drive the LEDs by displaying the raw audio waveform, a spectral decomposition (e.g., a Fourier transform), a standing-wave pattern (e.g., simulating a drum head on the surface of the case), or any other animated visual display that may or may not be synchronized with the audio provided.

Another embodiment of the present invention comprises a service on data network for generating a decorative pattern at a remote client. In this embodiment, a receiver in the display system (i.e. remote client) receives a broadcast of audio signals, alone or with accompanying video, transmitted from a transmitter at the service provider. The broadcast also includes the supply of control signals to generate the decorative patterns on the housing. The broadcast can be sent via satellite, cable or computer network (e.g. the Internet). In this embodiment, the processing section shown in FIG. 2 of the preferred embodiment can be bypassed and the broadcast provider can provide all control of the visual display directly to the display device 110. A hybrid embodiment may also be provided, wherein an initial signal is sent from the broadcaster with consumer interaction via a user interface.

Whether the display device is a separate unit or integrated into the actual physical case by molding the elements into a plastic material, by providing an array of display pixels on the surface of a physical case of a CE component, or for that matter, the physical casing of any object, the consumer is provided with a decorative and entertaining visual display not contemplated by the prior art.

The above-described embodiment of the invention focused on a device that provides an audio signal and the output provided is primarily a visual display. In the above description, the device that provided the audio output was primarily referred to as a CE device (or the like) and the description focused on a display device or portion that comprised a casing for the CE device. Other configurations are contemplated, such as a CE device that is separate from the display device or portion. The device that provides the audio signal need not be a CE device, but can be any device that provides audio or a signal that reflects an audio signal.

Other variations apart from mapping an audio signal to a visual display are contemplated and within the scope of the invention. (For convenience, in the ensuing description, the device analogous to the CE device that initially provides the audio, visual or other output will generally be referred to as the "initial device", while the device that outputs a corresponding sensory output will continue to be referred to as the "display", even if the output invokes a sense other than the visual sense.) For example, an initial device or devices that provide a visual output may be used in the invention for transformation into an audio "display". For example, an array of speakers may be embedded into an external case, manufactured into a foldable covering, or manufactured into a moldable covering. In a preferred embodiment the speakers utilized may be thin Mylar speakers such as those used in greeting cards, microelectronic transducers, or standard cone speakers. The use of a particular type of speaker is determined based upon the particular application and available physical space for incorporating the speakers. In certain applications as few as one or two speakers may suffice, but in order to provide an audio "display" a plurality is provided. The "display" or audio signal emitted from the speakers is generated to reflect the visual (or other) data received from the initial device. Thus, in addition to tonal and volume variations, spatial information can be displayed that reflects the visual input.

For example, a control or other desk may be comprised of a number of initial devices that output visual or other detectable output. For example, a security desk may have a number of displays (such as a quad display) that receive input from security cameras at different locations. As another example, in the control area of a power plant, there may be numerous gauges, meters, status lamps, etc. that receive input from electronic and other sensors that monitor conditions at various places in the plant. The visual or other output of such initial device(s) may be input to a control unit (comprised of processor(s)) that is programmed to drive the array of speakers comprising the audio display. Thus, the speakers located toward the right may be driven to indicate one set of data conditions (for example, a component failure or critical condition corresponding to an indicator on the right of the control desk) and the speakers located to the left may be driven to indicate another set of conditions (for example, a component failure or critical condition corresponding to an indicator on the left of the control desk). An apparent movement of the sound source (by driving certain speakers in the speaker array in succession, for example) may likewise represent a set of conditions, such as movement of an object or person from the field of view of one camera to another in a quad display. Likewise, the speakers may be driven to simulate left-right and up-down "ping-ponging" based on certain conditions.

In addition, a "status-quo" condition of the initial device(s) providing the output (in the form of visual or other data) may be used by the processor to provide a soft, harmonically pleasing tone by the speaker array to indicate that "all is well". A progressively louder or more dissonant tone (or percussion) might indicate warning or error conditions in the initial device(s). This provides a much richer and rapid transfer of information than that available from a simple alarm that may sound if one or more conditions are satisfied. Thus, a single worker surrounded on all sides by devices providing visual or other output may prioritize his or her attention on a certain device (which may not even be within his or her field of vision) based on the audio output he or she hears.

Figure 6:
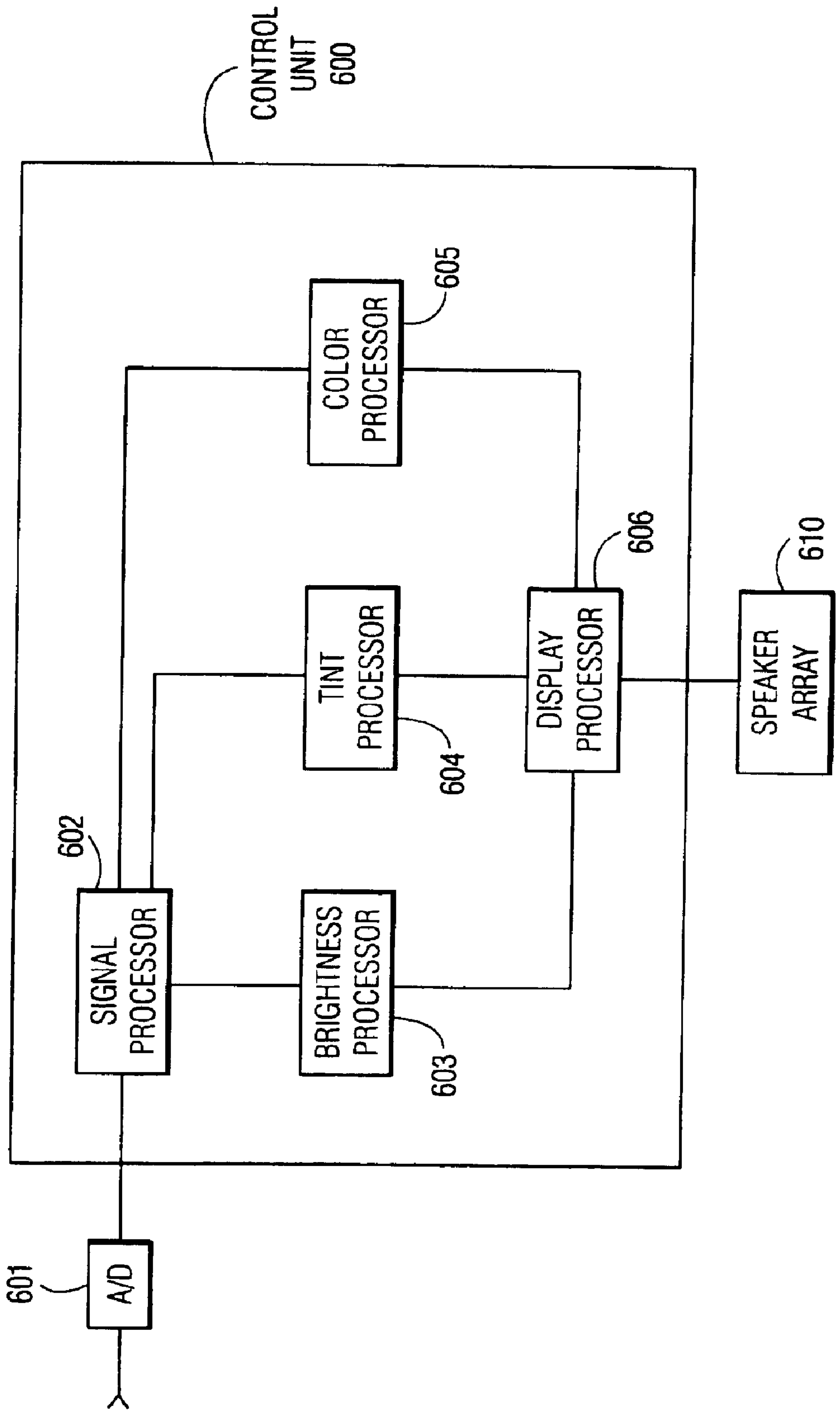
FIG. 6 is a block diagram illustrating the components of a system for creating audio representations of video signals according to another embodiment of the present invention.

An exemplary system for controlling a particular speaker array embodiment is depicted in FIG. 6 and is analogous to the system depicted in FIG. 2. As shown in FIG. 6 an input in the form of an output video signal (from an initial device or devices) is input into an A/D converter 601, if necessary, to convert an analog video signal into a digital video signal. If the input video signal is in a digital format the A/D converter 601 is bypassed. The video input may be, for example, the video feed for the quad display of a security desk. Whatever the source of the video signal the basic concept of the present invention remains the same. The digital video signal is then input into a control unit 600. The control unit 600 receives and processes the digital video signal at signal processor 602. The signal processor extracts various components from the video signal. These components can, for example, consist of brightness, tint, and color. As depicted in FIG. 6, brightness processor 603, tint processor 604, and color processor 605 each process its respective extracted components received from the signal processor 602. Each processor 603–605 processes its respective component by filtering, adjusting the amplitude, or modifying its frequency. The processed signals are forwarded to display processor 606. As previously noted, the term "display" is used in this case since the eventual audio signal output from the speaker array results in an audio display of information. The display processor 606 processes the signal to produce an output that drives speaker array 610. For example, the display processor 606 may detect motion in the video for the quad display and drive the speakers to reflect that motion, as described above. Where an electronic or other physical or sensory output is provided from an initial device to the control unit of the speaker array, such as in the example of a control area of a power plant, then the processors and their programming is adjusted in FIG. 6 to provide an appropriate corresponding output to the speaker array.

Also contemplated is a hybrid model to the foregoing embodiments, e.g. video and audio input that produces audio and visual displays. The processing elements contained in a hybrid control unit would contain both video and audio component processors and display processors. Processed components can also be interchanged. For example, a particular frequency of an input audio signal can be processed to produce a particular speaker array output. A display device and a speaker array would both be connected to the hybrid control unit providing both the visual display and the audio display to the user.

A further embodiment of the present invention contemplates a "display" device that produces artificial scents based on input that is provided by an initial device that provides either audio and/or video signals as output. Scent generating devices that generate particular smells as a function of input control signals may be adapted to provide a scent output that is a function of the audio or video signal received from an initial device. An example of an artificial scent generating product that has been developed is the iSmell device by Digiscents, Inc., described at www.digiscents.com. The audio and/or video signals (or electronic signals representing audio, video and/or other sensory output) of the initial device are provided as input to a control unit that provides control signals to the control circuitry of the scent generating device. The control unit is programmed to drive the scent generating device based on the audio, video or other signals received by the control unit from the initial device. For example, an acidic-lemony scent might be produced by either a high frequency audio signal or a yellow color received as output from an initial device. As another example, a chocolate scent might be produced by a low frequency audio signal or a brown color received by the control unit as input. Alternatively, a random scent may be generated when an input signal is received by the control unit.

In addition, completely artificial scents may be generated that correspond in some way to data that may not ordinarily be associated with a smell. Also, in combination with scent-based training, this could be used to provide or enhance warning or error conditions by generating scents that are related to various warning or error conditions received.

Another variation of the present invention provides a device wherein a physical texture or other sensation is output that is a function of a video, audio or other sensory signal input. Such a video, audio or other sensory signal may be the output of an initial device as described above, such as a CE device. In a particular embodiment, a data glove with tactile actuators in the fingers may have control circuitry that interfaces with a control unit that receives as input the video, audio or other sensory signal output by the initial device. The control unit is programmed to provide a particular tactile feel in the glove that is a function of the particular video, audio or other sensory signal received.

Alternatively, the control unit may interface with circuitry that drives small gas bladders (analogous to a sphygmomanometer) imbedded throughout an article of clothing that inflates and thus imparts pressure at various regions of the body as a function of the particular video, audio or other sensory signal received. Varying input signals are also contemplated. For example, an input signal received from an apparatus that represents a particular atmospheric pressure or wind speed might be processed by the control unit to indicate the direction of impending severe weather by pressurizing a particular arm or leg of the person wearing the clothing. Such a device is particularly useful in situations where vocal communication is prohibitive, for example, scuba diving. In such a setting, for example, a change in current, temperature, pressure, oxygen supply, etc. may be detected and a representative signal provided to the control unit. The control unit provides an alert to the diver in the form of pressurizing a particular bladder in the divers' wetsuit.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. An apparatus for displaying visual representations of audio signals on an object, comprising:

a control unit for processing an input signal and performing an input signal to visual pattern conversion; and a display device for displaying said visual pattern, said device including a generally planar light emitting layer being conformable to a surface shape;

wherein said display device conforms to a three dimensional surface shape of an outer surface of said object and is disposed in a thin layer.

2. The apparatus of claim 1, wherein said input signal comprises an audio component.

3. The apparatus of claim 2, said control unit further comprising at least one of a tempo, amplitude and frequency processing unit for use during said input signal to visual pattern conversion.

4. The apparatus of claim 1, wherein said display device displays the visual pattern using electroluminescent material.

5. The apparatus of claim 1, wherein said display device displays the visual pattern using transistors.

6. The apparatus of claim 1, wherein the control unit further comprises a user interface for controlling said input signal to visual pattern conversion.

7. The apparatus of claim 1, wherein the control unit contains software programming for controlling the generation of said visual pattern.

8. The apparatus of claim 1, wherein the three dimensional surface shape to which said display device conforms includes at least two surfaces oriented a about 90 degrees to one another.

9. The apparatus of claim 1, wherein said display device displays the visual pattern using electroluminescent material comprising a luminescent organic polymer.

10. The apparatus of claim 1, wherein the object comprises the case or housing for a CE device, the display device being disposed coextensive with two or more of the surfaces of the case.

11. The apparatus of claim 1, wherein the device includes a cathode layer, an anode layer, and a light emitting device between the cathode layer and the anode layer.

12. The apparatus of claim 11, wherein the device is an electroluminescence display device.

13. An apparatus for displaying visual representations of audio signals on an object, comprising:

a first moldable layer having a surface;

a plurality of light emitting devices positioned on the surface of said first moldable layer to form an array; and a second moldable layer positioned on said plurality of light emitting devices, said second moldable layer manufactured from one of a transparent and translucent material;

wherein said apparatus is moldable to conform to a three dimensional surface of said object and is disposed in a thin layer.

14. The apparatus of claim 13, further comprising a control device having at least one input for receiving an audio signal, and further having at least one output for connecting to said plurality of light emitting devices and for controlling said light emitting devices.

15. The apparatus of claim 13, wherein the device includes a cathode layers an anode layer, and a light emitting device between the cathode layer and the anode layer.

16. The apparatus of claim 15, wherein the device is an electroluminescence display device.

17. An apparatus for displaying visual representations of audio signals on an object, comprising:

a first layer having a surface;

a plurality of light emitting devices positioned on the surface of said first layer to form an array; and a second layer positioned on said plurality of light emitting devices, wherein said second layer manufactured from one of a transparent and translucent material;

wherein said layers include means for folding the apparatus over a three dimensional surface of said object and is disposed in a thin layer.

18. The apparatus of claim 17, wherein the device includes a cathode layer, an anode layer, and a light emitting device between the cathode layer and the anode layer.

19. The apparatus of claim 18, wherein the device is an electroluminescence display device.

20. An apparatus for displaying sensory representations of input signals on an object, comprising:

a control unit for processing the input signal and performing an input signal to sensory pattern conversion; and a display device for outputting said sensory pattern;

wherein said display device conforms to a three dimensional surface shape of an outer surface of said object and is disposed in a thin layer.

21. The apparatus of claim 20, wherein the device includes a cathode layer, an anode layer, and a light emitting device between the cathode layer and the anode layer.

22. The apparatus of claim 21, wherein the device is an electroluminescence display device.

* * * * *